(12) United States Patent
Ahmed

(10) Patent No.: US 7,574,055 B2
(45) Date of Patent: *Aug. 11, 2009

(54) ENCODING DOCUMENTS USING PIXEL CLASSIFICATION-BASED PREPROCESSING AND JPEG ENCODING

(75) Inventor: Mohamed Nooman Ahmed, Louisville, KY (US)

(73) Assignee: Lexmark International, Inc., Lexington, KY (US)

( * ) Notice: Subject to any disclaimer, the term of this patent is extended or adjusted under 35 U.S.C. 154(b) by 744 days.

This patent is subject to a terminal disclaimer.

(21) Appl. No.: 10/935,557

(22) Filed: Sep. 7, 2004

(65) Prior Publication Data

US 2006/0050881 A1  Mar. 9, 2006

(51) Int. Cl.
*G06K 9/36* (2006.01)
(52) U.S. Cl. .................................................. 382/232
(58) Field of Classification Search ................ 382/232, 382/233, 248, 250, 181, 190, 195; 345/555–565; 348/384.1–440.1; 708/203–210
See application file for complete search history.

(56) References Cited

U.S. PATENT DOCUMENTS

| | | | |
|---|---|---|---|
| 5,016,173 A * | 5/1991 | Kenet et al. ................ | 382/128 |
| 5,416,604 A * | 5/1995 | Park .......................... | 382/232 |
| 5,465,304 A | 11/1995 | Cullen et al. | |
| 5,535,013 A | 7/1996 | Murata | |
| 5,696,842 A | 12/1997 | Shirasawa et al. | |
| 5,778,092 A | 7/1998 | MacLeod et al. | |
| 5,875,041 A | 2/1999 | Nakatani et al. | |
| 5,883,979 A | 3/1999 | Beretta et al. | |
| 5,886,790 A | 3/1999 | Abe | |
| 5,907,362 A | 5/1999 | Yamamoto | |
| 5,933,532 A * | 8/1999 | Mihara ...................... | 382/232 |
| 5,949,964 A | 9/1999 | Clouthier et al. | |
| 5,959,675 A | 9/1999 | Mita et al. | |
| 5,982,937 A | 11/1999 | Accad | |
| 6,014,467 A | 1/2000 | Asano | |
| 6,075,619 A | 6/2000 | Iizuka | |
| 6,102,291 A * | 8/2000 | Mazzone ............... | 235/462.01 |
| 6,198,850 B1 | 3/2001 | Banton | |
| 6,252,994 B1 | 6/2001 | Nafarieh | |
| 6,285,458 B1 | 9/2001 | Yada | |
| 6,298,166 B1 * | 10/2001 | Ratnakar et al. ............. | 382/248 |
| 6,307,962 B1 | 10/2001 | Parker et al. | |
| 6,314,208 B1 | 11/2001 | Konstantinides et al. | |
| 6,320,982 B1 | 11/2001 | Kurzweil et al. | |
| 6,330,363 B1 | 12/2001 | Accad | |
| 6,400,844 B1 | 6/2002 | Fan et al. | |
| 6,701,020 B2 * | 3/2004 | Chrysafis et al. ............ | 382/239 |
| 7,233,623 B1 * | 6/2007 | Pau et al. .................. | 375/240.2 |
| 2001/0043754 A1 | 11/2001 | Memon et al. | |
| 2003/0123740 A1 | 7/2003 | Mukherjee | |
| 2005/0135693 A1 | 6/2005 | Ahmed et al. | |

(Continued)

*Primary Examiner*—Samir A. Ahmed
*Assistant Examiner*—Atiba O Fitzpatrick
(74) *Attorney, Agent, or Firm*—Michael Best & Friedrich LLP

(57) ABSTRACT

A method for JPEG encoding an image that includes preprocessing steps performed prior to a JPEG compression step. The preprocessing steps include transforming block image data, using a variable quantization table selected for each block according to the classification of pixels in that block to produce quantized image data, and inverse transforming the quantized image data to produce filtered image data.

14 Claims, 1 Drawing Sheet

U.S. PATENT DOCUMENTS

2005/0213836 A1 9/2005 Hamilton
2006/0050881 A1 3/2006 Ahmed
2007/0036450 A1 2/2007 Kondo et al.

* cited by examiner

US 7,574,055 B2

ENCODING DOCUMENTS USING PIXEL CLASSIFICATION-BASED PREPROCESSING AND JPEG ENCODING

FIELD OF THE INVENTION

The present invention relates generally to compressing document image data using standard JPEG compression, and specifically, to preprocessing steps performed prior to a JPEG compression step.

BACKGROUND OF THE INVENTION

Documents containing both text and pictures, known as compound documents, are becoming more prevalent. Previously, documents often consisted exclusively of text or exclusively of pictures (i.e., halftones). Pictures, as used herein, refer to photographs, naturalistic artwork, and graphical material. Text includes lettering, certain line drawings, and certain patterns. In order to represent compound documents electronically, it is desirable to have the ability to compress the image data corresponding to the document. Compression saves on storage space and allows the data to be more quickly transmitted, whether the purpose is photocopying a document, sending image data to a printer, or saving and sending image data via e-mail or facsimile.

Many different compression algorithms exist, some standard and some proprietary. In general, certain compression algorithms are better suited to text while other compression algorithms are better suited to pictures.

JPEG (Joint Photographic Experts Group) is the name of a committee and the name of the international standard adopted by that committee which applies to the compression of graphic images (pictures). The JPEG standard is one of the most popular and comprehensive continuous tone, still frame compression standards. JPEG defines three different coding systems: (1) a lossy baseline coding system, which is based on a discrete cosine transform (DCT); (2) an extended coding system for greater compression and progressive reconstruction applications; and (3) a lossless independent coding scheme for reversible compression. In order to be JPEG compliant, a product or system must include support for the lossy baseline coding system.

Lossy image compression refers to a technique wherein the compressed data cannot be decompressed into an exact copy of the original image, i.e., there is a loss of quality of the final image. An important goal in lossy image compression is to achieve maximum compression while still obtaining high image quality of the decompressed image. In order to provide acceptable image quality in the decompressed image, in general, a greater amount of compression is possible for pictures or halftones as compared to text. Too great of a compression amount for text often introduces unacceptable artifacts into the decompressed image.

In the JPEG lossy baseline system, compression is performed in three sequential steps: DCT computation, coefficient quantization, and finally lossless compression.

The image is first divided into non-overlapping blocks of size 8 by 8 pixels, which are processed in an order from left to right, top to bottom. After a normalization step, a two-dimensional DCT is applied to each block. This transform, similar to a Fourier transform, produces a transformed block (matrix) in the frequency domain. The first coefficient (location 0,0) in the transformed block is a constant that represents the average or DC component of the 64 image elements (pixels) included in each image block. The remaining coefficients describe higher frequencies found in the block.

The DCT coefficients are then quantized using a defined quantization table and reordered using a zigzag pattern to form a one-dimensional sequence of quantized coefficients. Lossless entropy coding, such as Huffman coding, is then applied to the resulting sequence to produce the compressed data.

Although there are a number of settings that can be predefined to achieve different compression ratios, one parameter, called the quality factor, can be adjusted in JPEG compression. The quality factor is a single number in an arbitrary, relative scale and is often adjusted on an image-by-image basis. A higher quality factor will provide a relatively high quality decompressed image, but will require a relatively large file (less compression). A lower quality factor will provide greater compression with a correspondingly smaller file size. However, there may be more visible defects or artifacts in the decompressed image. Generally, pictures can be compressed to a greater degree as compared to text, in order to maintain acceptable decompressed image quality.

U.S. Pat. No. 6,314,208 describes an image compression system that can be used to apply different quantization factors to blocks of picture and text to provide significant image compression. The quantization factors are selected by examining the DCT coefficients in the transformed block and estimating metrics that would indicate the presence of text versus pictures.

SUMMARY OF THE INVENTION

The invention provides a method for encoding an image comprising a plurality of pixels. The method includes the steps of classifying each pixel of the image as one of a plurality of pixel classifications, and defining the image as a plurality of blocks of pixels. For each block, the block is classified as one of a plurality of block classifications based on the pixel classifications of pixels in that block, and a discrete cosine transform is performed on the block to produce a transformed matrix including transform coefficients. Next, the transform coefficients are quantized using a selected quantization table according to the block classification to produce a quantized matrix. An inverse discrete cosine transform is performed on the quantized matrix to produce a filtered image, and a JPEG compression is then performed on the filtered image.

Other features and advantages of the invention will become apparent to those skilled in the art upon review of the following detailed description, claims, and drawings.

DETAILED DESCRIPTION OF THE PREFERRED EMBODIMENTS

Figure 1:
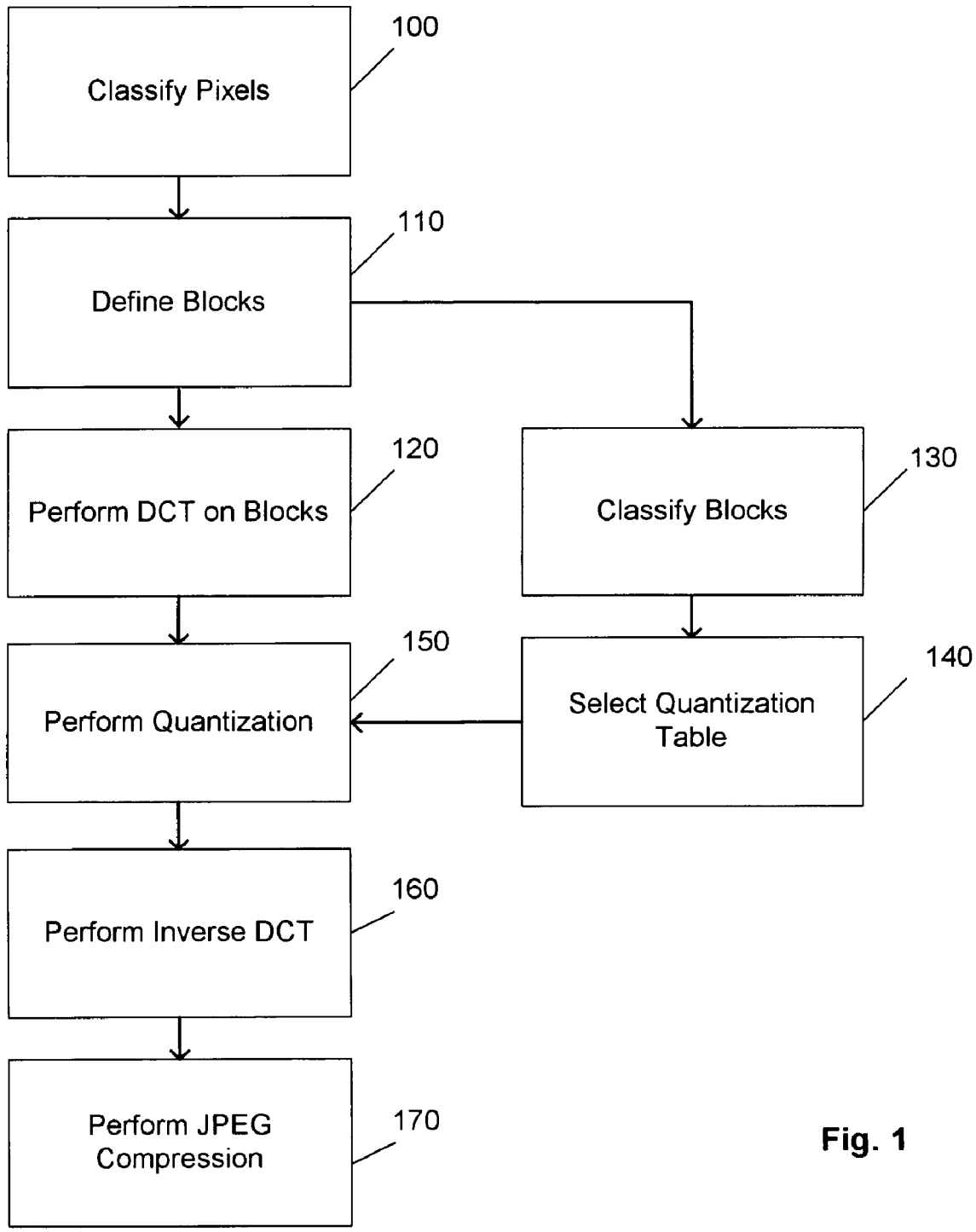
FIG. 1 illustrates a flow chart for encoding an image according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed there-after and equivalents thereof as well as additional items. The order of limitations specified in any method claims does not imply that the steps or acts set forth therein must be performed in that order, unless an order is explicitly set forth in the specification. In addition, it should be noted that a plurality of hardware and software based devices, as well as a plurality of different structural components may be utilized to implement the invention.

Method steps 100-170 for JPEG encoding an image are illustrated in FIG. 1. These method steps operate on image data that includes a plurality of pixels. For example, image data corresponding to a scanned document is of size 512 by 512 pixels and each pixel includes an eight bit intensity value such as a gray scale value. Clearly, image data of various sizes and resolutions can be used, and such data can also represent color images. For example, color images would typically be represented as three different image files, and each one would be separately processed.

In particular, in order to JPEG encode a document image, at step 100, each pixel of the image data is classified as one of a plurality of pixel classifications. At step 110, image blocks are defined, and the blocks are transformed using a DCT at step 120. At step 130, each block in the image is classified as one of a plurality of block classifications.

At step 140, a quantization table for each block is selected, and at step 150, the coefficients of each transformed block are quantized using the selected quantization table. At step 160, an inverse DCT is performed on the quantized coefficients to produce a filtered array. At step 170, standard JPEG compression is performed on the filtered array.

More specifically, step 100 operates to classify each pixel in the image as one of a plurality of pixel classifications. For example, in one embodiment, the pixels can be classified into classifications that may include text, halftone, and mixed. The category "mixed" refers to pixels that do not match closely with either text or halftone. Other pixel classifications can be envisioned as well, such as background. Each pixel can be classified based on an analysis of neighboring pixels. For example, an N by N window, centered at a specific pixel of interest at location x,y in the image data can be defined as follows:

$$\begin{bmatrix} f(0,0) & f(0,1) & \cdots & \cdots & f(0,N-1) \\ f(1,0) & & & & \\ \vdots & & & & \\ \vdots & & & & \\ f(N-1,0) & & & & f(N-1,N-1) \end{bmatrix}$$

where f(x,y) represents the intensity at location x,y.

In a preferred embodiment, for documents that are scanned at 600 dpi, an appropriate value for N is 17, such that a 17 by 17 window is defined, centered at the specific pixel of interest.

Looking at each N×N window, the sum, $H_i$, of each row i and the sum, $V_j$, of each column j are calculated, as are the sums, $D_1$ and $D_2$, along the two diagonals, as defined by the following:

$$H_i = \sum_{y=0}^{N-1} f(i, y) \qquad i = 0, 1, \ldots, N-1$$

$$V_j = \sum_{x=0}^{N-1} f(x, j) \qquad j = 0, 1, \ldots, N-1$$

$$D_1 = \sum_{i=0}^{N-1} f(i, i) \qquad i = 0, 1, \ldots, N-1$$

$$D_2 = \sum_{i=0}^{N-1} f(i, N-1-i) \qquad i = 0, 1, \ldots, N-1$$

Further, the following minimum and maximum values are defined:

$m_H = \min(H_i)$ $M_H = \max(H_i)$ $m_V = \min(V_j)$ $M_V = \max(V_j)$

Next, several tests are performed. For example, if $M_H - m_H$ is less than or equal to a first predefined threshold T1, and $M_v - m_v$ is less than or equal to T1, and $|D_1 - D_2|$ is less than or equal to a second predefined threshold T2, then the pixel is classified as halftone. Otherwise, the pixel is classified as a potential text element (PTE), and a further test follows.

In this further test, it is determined whether a PTE should be classified as text or mixed. This is accomplished using a modified line detector kernel. For example, a smaller M by M window centered around the specific pixel of interest can be used. In a preferred embodiment, M=7 has been found to provide appropriate results. In particular, using a 7 by 7 window centered around the specific pixel of interest:

If, for $-2 \leq i \leq 2$, $|f((N-1)/2-i, (N-1)/2-2) - f((N-1)/2-i, (N-1)/2+2)| \geq T3$ or, for $-2 \leq i \leq 2$, $|f((N-1)/2-2, (N-1)/2-i) - f((N-1)/2+2, (N-1)/2-i)| \geq T3$ where T3 is a third predefined threshold, then, the specific pixel of interest is classified as text. Otherwise, this pixel is classified as mixed.

The image is divided into blocks of pixels at step 110. For example, the blocks can be of size 8 by 8 pixels. However, the blocks can also be of a different size.

At step 120, the blocks are classified as one of a plurality of block classifications. The plurality of block classifications defined can vary and may include text, halftone, mixed, and/or background, yet need not be identical to the plurality of pixel classifications used to classify the pixels. In one embodiment, the block classifications include text and halftone. In another embodiment, the block classifications include text, halftone and mixed. Here the category "mixed" refers to blocks that do not match closely with either text or halftone.

In one embodiment, if the total number of pixels classified as text in a block of interest exceeds a predefined threshold T4, then the block is classified as text. If the total number of pixels classified as text in the block does not exceed the predetermined threshold T4, then the block is classified as halftone.

In another embodiment, the block classifications are the same as the pixel classifications and the predominant classification of pixels in the block determines the block classification. Various other block classification schemes can also be used.

At step 130, the blocks are transformed using a 2D discrete cosine transform (DCT). This transform converts each block of image data to the spatial frequency domain. In particular, a transformed matrix of order N is generated by the following equation:

$$T(u, v) = \frac{C(u)C(v)}{4} \sum_{p=0}^{7} \sum_{q=0}^{7} f(p, q) \cos\left[\frac{(2p+1)\pi u}{16}\right] \cos\left[\frac{(2p+1)\pi v}{16}\right]$$

Where, for $v \neq 0$, $C(v)=1$; and if $v=0$:

$$C(v) = 1/\sqrt{2}$$

In one embodiment, each pixel of the image data is represented by an intensity value that is an 8 bit gray scale value. As each block is transformed, a transformed matrix of size 8 by 8 is produced. In one embodiment, the 64 coefficients in the transformed matrix are each 11 bits. In the transformed matrix, the first coefficient is a constant that represents the average of the 64 pixels contained within each block. The remaining coefficients describe higher frequencies found in the block.

At step 140, a quantization table is selected for each transformed matrix based on the classification of its corresponding block. This allows a variable quantization to be applied to each transformed matrix in order to compress text areas to a lesser extent as compared to halftone areas, such that the decompressed image has a desirable perceptual quality (i.e., it is not significantly degraded). For example, a quantization table, $Q(i,j)$, having size 8 by 8, can be defined that includes the following entries:

```
16  11  10  16  24  40  51  61
12  12  14   .   .   .
 .
 .
 .                      .
 .              .
72  92  95  98 112 100 103  90
```

In one embodiment, with the block classifications being halftone and text, if the block is classified as halftone, then a quantization table having relatively larger values is selected, and if the block is classified as text, then a quantization table having relatively smaller values is selected. For background blocks, where the color value or intensity is almost constant, much higher quantization values can be used.

At step 150, quantization is performed on the coefficients of the transformed matrix, to produce, for each block, a quantized matrix. Quantization is the process that reduces the number of bits needed to store a value in the transformed matrix by reducing the precision of the value stored. Generally, the precision of the coefficients can be reduced according to their location in the transformed matrix. In other words, the farther away from the origin (0,0) an element is, the less it contributes to the image, and the less important it is to maintain rigorous precision in its value. For every element position in the transformed matrix, there is a corresponding quantum value in the quantization table where $Q(i,j)$ is the quantum value. Specifically, quantization is performed according to the following equation:

$$Z(i, j) = \frac{T(i, j)}{Q(i, j)} \text{(rounded)}$$

In this manner, after quantization, text areas will keep more high frequency information, thereby improving the overall perceptual quality of the decompressed image, while halftone and background areas will keep less.

At step 160, an inverse DCT is performed on each quantized matrix. Each inverse DCT produces a filtered image portion corresponding to one of the plurality of blocks. The filtered image portions together comprise the filtered image.

At step 170, standard JPEG compression is performed on the filtered image. Standard JPEP compression comprises DCT transformation, coefficient quantization, using a single quantization table for each block, and then lossless compression.

Various features and advantages of the invention are set forth in the following claims.

What is claimed is:

1. A method for encoding an image including a plurality of pixels, comprising:

classifying each pixel of the image as one of a plurality of pixel classifications;

defining the image as a plurality of blocks of pixels;

for each block, classifying that block as one of a plurality of block classifications based on the pixel classifications of pixels in that block;

for each block, performing a discrete cosine transform upon that block to produce a transformed matrix corresponding to that block and including transform coefficients for that block;

for each transformed matrix and corresponding block, quantizing the transform coefficients of that transformed matrix using a selected quantization table according to the block classification of that block to produce a quantized matrix corresponding to that block;

for each quantized matrix and corresponding block, performing an inverse discrete cosine transform on that quantized matrix to produce a filtered image portion, the filtered image portions together comprising a filtered image; and performing a JPEG compression on the filtered image, wherein a specific pixel is classified by analyzing the intensity values of a plurality of pixels in an N by N window centered around that specific pixel, the analysis including:

determining a first maximum value of a first plurality of values that includes the sums of the intensity values of each row of the N by N window, determining a first minimum value of that first plurality of values, and calculating a first difference between the first maximum value and the first minimum value;

determining a second maximum value of a second plurality of values that includes the sums of the intensity values of each column of the N by N window, determining a second minimum value of that second plurality of values, and calculating a second difference between the second maximum value and the second minimum value; and classifying a pixel as halftone if the first difference and the second difference are less than or equal to a first predefined threshold T1, and wherein said method is performed by a processor.

2. The method of claim 1, wherein N=17.

3. The method of claim 1, further including classifying a pixel as a potential text element if the first difference or the second difference is greater than the first predefined threshold T1.

4. The method of claim 1, further including classifying a potential text element as text if a modified line detector kernel of size M by M centered around the pixel of interest indicates the presence of text.

5. The method of claim 1, further including the steps of:
summing the intensity values along the two diagonals of the N by N window to produce a first sum and a second sum, and determining a third difference between the first sum and the second sum; and
classifying a pixel as halftone if the first difference and the second difference are less than or equal to a first predefined threshold T1 and the absolute value of the third difference is less than or equal to a second predefined threshold T2.

6. The method of claim 5, further including classifying a pixel as a potential text element if the first difference or the second difference is greater than the first predefined threshold T1 or the third difference is greater than the second predefined threshold T2.

7. The method of claim 6, further including classifying a potential text element as text if a modified line detector kernel of size M by M centered around the pixel of interest indicates the presence of text.

8. A method for encoding an image including a plurality of pixels, comprising:
classifying each pixel of the image as one of a plurality of pixel classifications;
defining the image as a plurality of blocks of pixels;
for each block, classifying the block as one of a plurality of block classifications based on the pixel classifications of pixels in that block, performing a discrete cosine transform on the block to produce a transformed block including transform coefficients, quantizing the transform coefficients using a selected quantization table according to the block classification to produce a quantized block, and performing an inverse discrete cosine transform on the quantized block to produce a filtered image portion;
combining the filtered image portions for all the blocks to produce a filtered image; and
performing a JPEG compression on the filtered image, wherein a specific pixel is classified by analyzing the intensity values of a plurality of pixels in an N by N window centered around that specific pixel, the analysis including:
determining a first maximum value of a first plurality of values that includes the sums of the intensity values of each row of the N by N window, determining a first minimum value of that first plurality of values, and calculating a first difference between the first maximum value and the first minimum value;
determining a second maximum value of a second plurality of values that includes the sums of the intensity values of each column of the N by N window, determining a second minimum value of that second plurality of values, and calculating a second difference between the second maximum value and the second minimum value; and
classifying a pixel as halftone if the first difference and the second difference are less than or equal to a first predefined threshold T1, and
wherein said method is performed by a processor.

9. The method of claim 8, wherein N=17.

10. The method of claim 8, further including classifying a pixel as a potential text element if the first difference or the second difference is greater than the first predefined threshold T1.

11. The method of claim 10, further including classifying a potential text element as text if a modified line detector kernel of size M by M centered around the pixel of interest indicates the presence of text.

12. The method of claim 8, further including the steps of summing the intensity values along the two diagonals of the N by N window to produce a first sum and a second sum, determining a third difference between the first sum and the second sum, and only classifying a pixel as halftone if the absolute value of the third difference is less than or equal to a second predefined threshold T2.

13. The method of claim 12, further including classifying a pixel as a potential text element if the first difference or the second difference is greater than the first predefined threshold T1.

14. The method of claim 13, further including classifying a potential text element as text if a modified line detector kernel of size M by M centered around the pixel of interest indicates the presence of text.

* * * * *